(Model.) 3 Sheets—Sheet 1.
F. L. McILVAINE.
Wind Engine.
No. 242,211. Patented May 31, 1881.
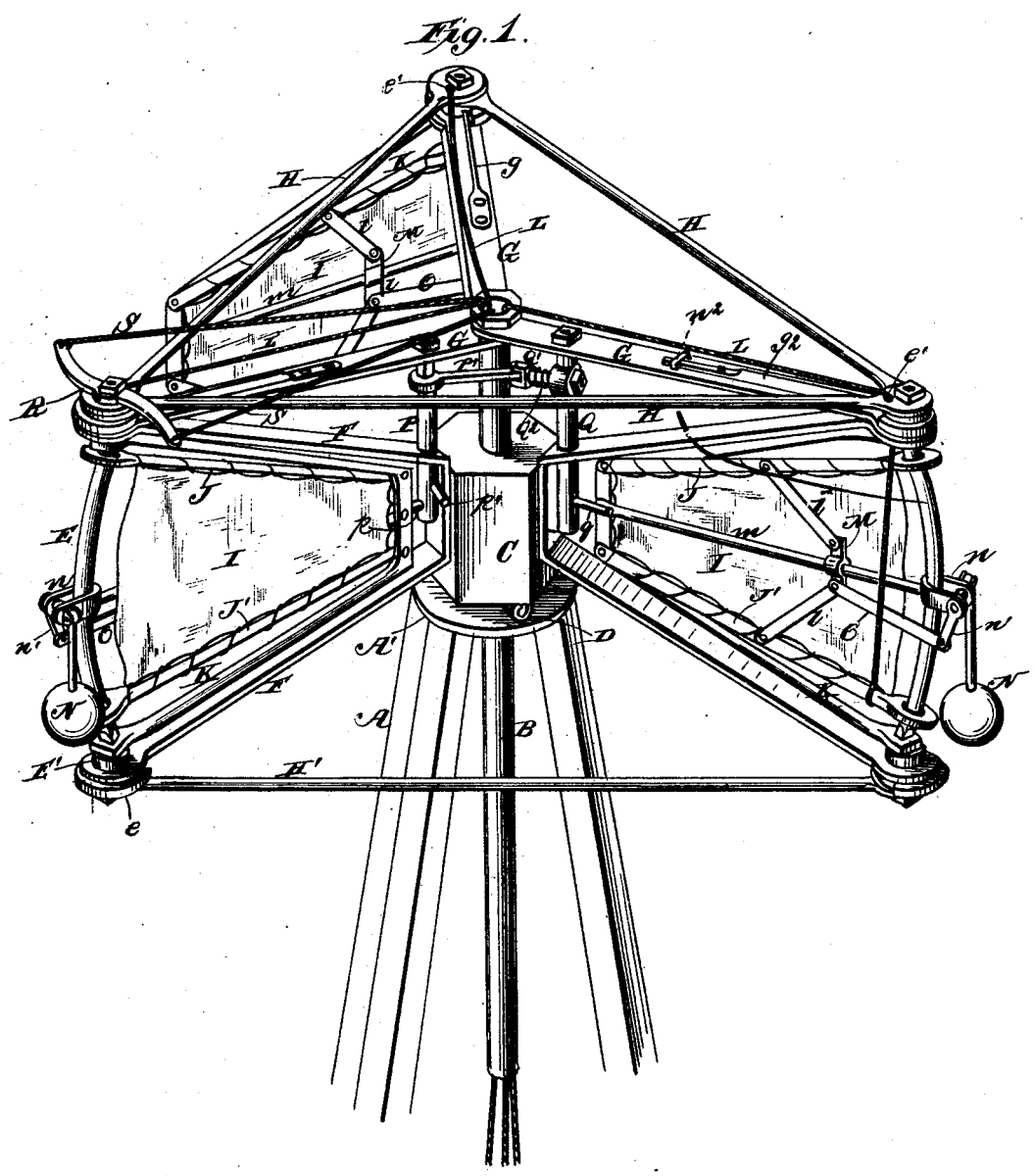
Witnesses.
Robert Everett.
Edward G. Siggers
Inventor.
Force L. McIlvaine
by W. H. Babcock
Atty.

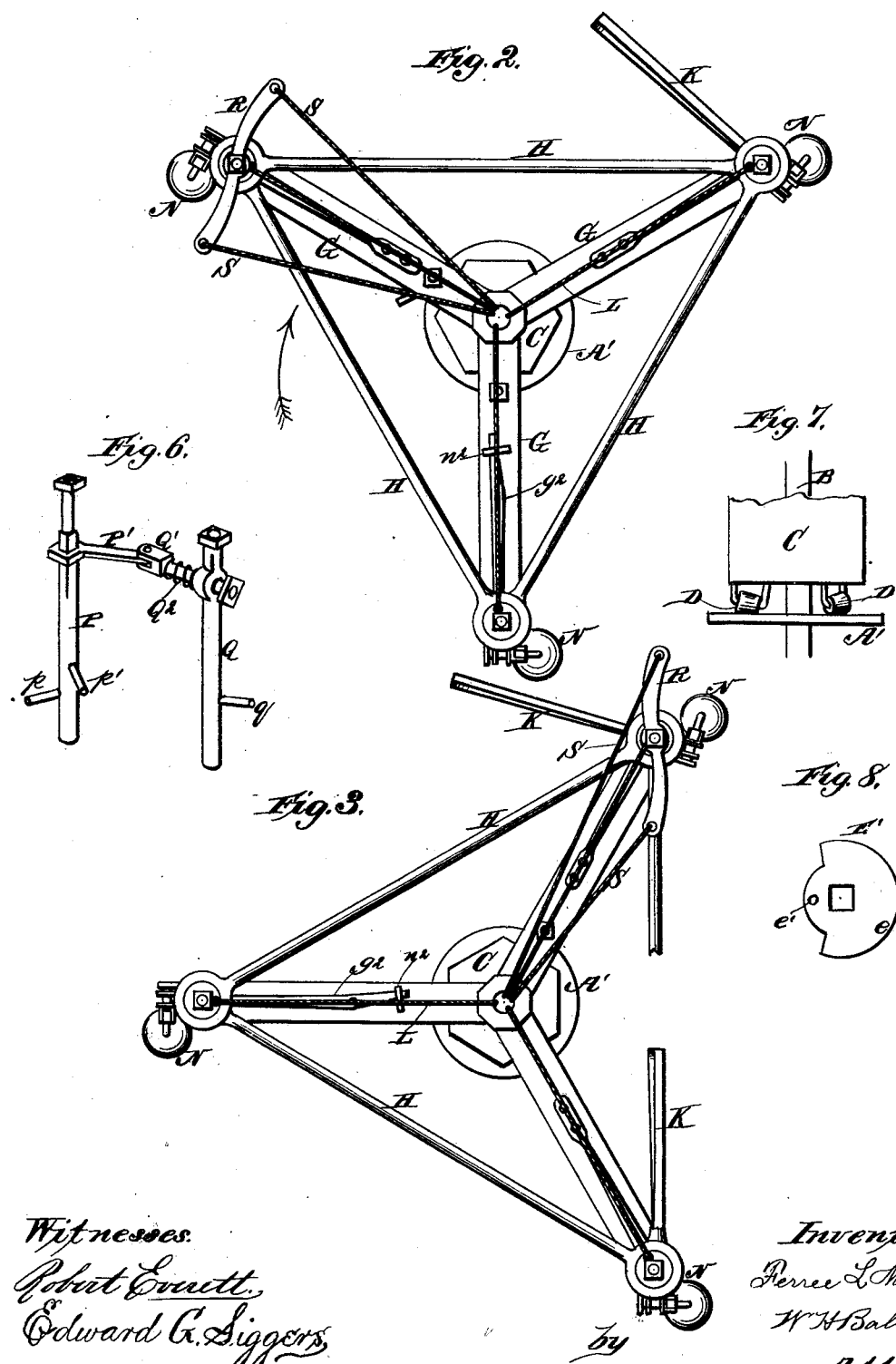

(Model.) 3 Sheets—Sheet 3.

F. L. McILVAINE.
Wind Engine.

No. 242,211. Patented May 31, 1881.

Witnesses:
Robert Everett,
Edward G. Siggers

Inventor:
Ferre L. McIlvaine
W. H. Babcock
by Atty.

UNITED STATES PATENT OFFICE.

FERREE L. McILVAINE, OF GAP, PENNSYLVANIA.

WIND-ENGINE.

SPECIFICATION forming part of Letters Patent No. 242,211, dated May 31, 1881.

Application filed March 21, 1881. (Model.)

*To all whom it may concern:*

Be it known that I, FERREE L. MCILVAINE, a citizen of the United States, residing at Gap, in the county of Lancaster and State of Pennsylvania, have invented certain new and useful Improvements in Wind-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to adapt the sails of windmills to turn within certain limits, as hereinafter described, so that each sail will have the benefit of the direct force of the wind for one hundred and eighty degrees of its revolution, and of the wind on the tack for ninety degrees more; also, to provide satisfactory means whereby the sails will automatically arrange themselves so as to remain motionless when the wind blows too hard for safety; also, to provide suitable anti-friction devices which will also operate as braces; also, to provide governing devices for expanding and contracting the sails to compensate for changes in the velocity of the wind; and, finally, in providing for the furling of the sails and for their starting when automatically stopped, as above stated, by means of devices which may be operated from the ground.

Figure 4:
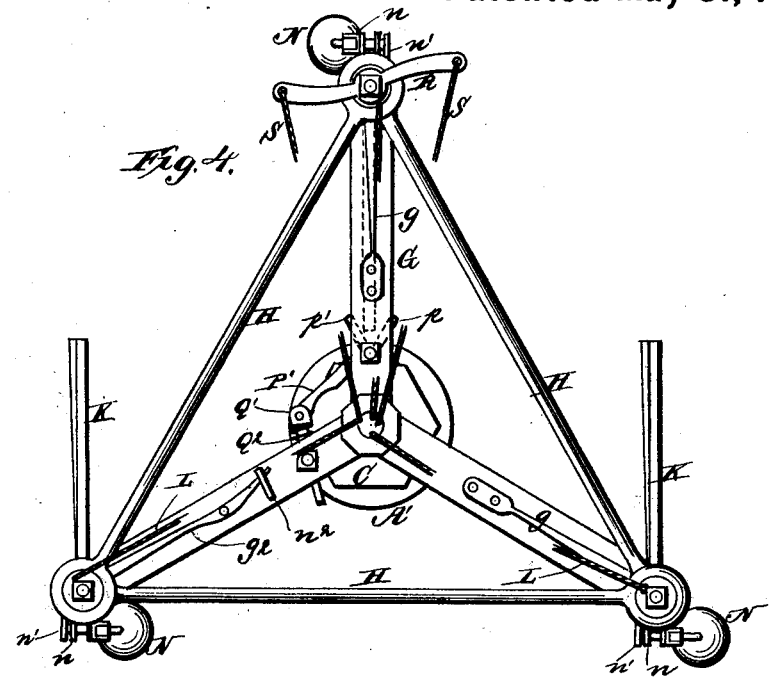
Figure 5:
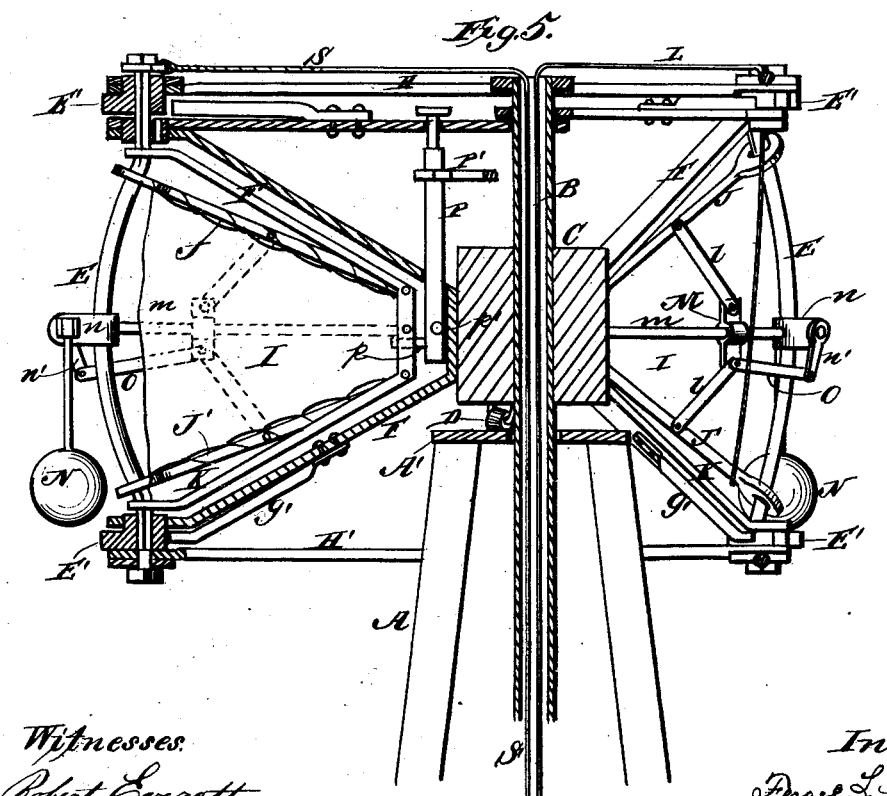

In the accompanying drawings, Figure 1 represents a perspective view of a windmill embodying my invention, one sail being on the side opposite to the wind, but still receiving its direct force. Fig. 2 represents a top or plan view of the same in the same position. Fig. 3 represents a top or plan view of the same immediately after the sail opposite to the wind has been struck on the other side and turned for tacking. Fig. 4 represents a top or plan view of the same, showing the sail opposite the wind locked in line therewith, and the other sails in line therewith also. Fig. 5 represents a vertical section through my improved windmill. Fig. 6 represent a detail perspective view of the locking devices. Fig. 7 represents a detail view of the anti-friction and bracing devices.

In said drawings, A designates the tower of the windmill, and B a hollow shaft passing up through the same. This shaft is suitably geared to the grinding or other mechanism, and thus constitutes the driving-shaft of the mill. On this hollow shaft is secured a solid block, C, which constitutes the body of the sail mechanism, and which is provided on its bottom with horizontally and radially arranged conoidal rollers D, that turn upon a plate or disk, A', which is secured to the top of said tower. As the larger ends of said conoidal rollers are arranged outward they serve as braces on every side against the centrifugal motion of the sails and the force of the wind. These rollers are also anti-friction devices. They, in effect, enlarge the base of the sail mechanism without impeding its rotation, and revolve without grinding or slipping.

The upright though slightly curved bars E, to which the sails are respectively attached, are supported by bracket-frames F, each of which is a plate of metal bent so that its ends extend respectively to the upper and the lower end of the bar which it supports, the middle part of each bracket being attached to the block C. Each bracket has approximately the shape of the letter V with the point cut off or flattened. The ends of these brackets are provided with openings which afford bearings for cylindrical journal-blocks E', which are arranged respectively at the upper and lower ends of each bar E, and firmly secured thereto.

G designates a series of upper brace-bars extending radially from the driving-shaft B to each of the bars E, and having perforated outer ends which surround the upper journal-pieces, E', of the respective bars E.

H and H' designate respectively bracing-bars of an upper and of a lower series. Each brace-bar H connects two of the bars E at their upper ends. Each brace-bar H' in like manner connects two of the bars E at their lower ends. The brace-bars G, which are preferably broad and strong, thus form a radial series of braces, while H H' form a double peripheral series of braces. They are made as light as is consistent with the requisite strength, in order to lessen the weight of the outer part of the frame for the sail mechanism.
On each journal piece or casting E' is formed an annular flange, e, arranged above or below the proximate end of the supporting-bracket. These flanges, as well as the journal-pieces E', turn with their respective upright bars E, and they are recessed on one side so as to come into engagement, when turned a certain distance, with the free end of a spring-plate, g, the other end of which is fixed to one of the brace-bars G, or to the corresponding bracket or bracket-frame. When the sail is struck by a sudden gust of wind or flies out on the tack the force of the blow is cushioned by the engagement of said flange with said spring. Of course the flange may have a protuberance instead of a recess, or it may carry a spring which will engage a fixed stud or lug. One of the sails has a different form of spring, as hereinafter set forth.

As the ends of the bracket-arms F are respectively below the upper and above the lower flange of each bar E, and as the ends of the bars H are above the upper flanges and the ends of bars H' are below the lower flanges, nothing more is needed except suitable end fastenings for upright bars E to unite the foregoing parts in one strong and symmetrical frame. For these end fastenings I employ nuts, keys, or any other suitable devices. The braces may all be attached to the sail-frames instead of to bars E.

I designates the sails, each of which has approximately the form of a truncated isosceles triangle, the small end being inward. This small end is attached to the corresponding portion of a sail-frame, K, which has the shape of its bracket-frame, hereinbefore described, and is arranged within the same. The ends of this sail-frame are secured to one of the upright rocking bars E, so that the sail, sail-frame, and its bar E turn from side to side together. The upper and lower edges of each sail are attached respectively to its upper reefing-arm, J, and its lower reefing-arm, J'. The inner ends of said arms are pivoted to the inner end of the sail-frame, and their outer ends move freely upon the bar E of said sail.

From the outer end of each lower reefing-arm, J', a cord extends up through a channel, e', in the upper journal piece or casting, E', of its bar E, and thence to the upper end of hollow shaft B, and down through the latter to the ground. By pulling on these reefing-cords (designated L) the lower reefing-arm of each sail is, of course, turned upward on its pivot. This communicates a downward motion to the corresponding upper reefing-arm through the medium of connecting arms or links l l, which extend from said reefing-arms to an intermediate collar, M, that slides on a horizontal rod, m, attached rigidly at its inner end to the sail-frame and at its outer end to the upright bar E. When said reefing-arms are thus drawn together the area covered by the sail is correspondingly lessened, and the wind has less effect thereon. Thus the speed of the sails may be diminished at will. It is desirable, however, that such diminution should not be absolutely dependent upon the watchfulness of the operator, but that the speed should be kept within certain limits and approximately uniform without human intervention. To effect this I employ a governor-ball, N, the rod of which is swiveled on a small shaft, which turns in a bracket, n, that is secured to upright bar E. A crank-arm, n', on this shaft is linked with said collar by a pitman or connecting rod, O. The weight of the governor-ball operates through these connections to hold the sail expanded until the centrifugal force is sufficient to overcome said weight and throw said governor-ball outward, thereby drawing the reefing-arms together. As the speed diminishes the ball tends to fall and open the sail again. Thus, under ordinary circumstances, the governor operates, like that of a steam-engine, to secure uniformity of action. The swiveling of the governor-rods allows them to keep in line with the center rod in tacking.

The springs g, already described, act not only as a guard against the effects of any sudden gust, but also to absolutely prevent the turning of the sails too far in either direction. To assist them in these functions similar springs or spring-arms, g', are attached to the lower parts of the brackets, and bear in like manner against the lower flanges. These springs allow the sails to move one-fourth of a circle, but no more.

The operation is substantially as follows: Each sail is carried by the direct force of the wind from a position nearly in line therewith to the position shown in Figs. 1 and 2, as taken by the sail, which is opposite the wind. (Represented by an arrow.) On passing this point its opposite side is presented slightly to the wind, which at once throws it into the position shown in Fig. 3, where the wind strikes it as it would the sail of a vessel in tacking. This continues until the sail comes in line with the wind, which, as the sail can swing ninety degrees only, will be when another fourth of the circle has been passed by said sail.

By the above construction, combination, and arrangement, each sail has the benefit of the direct force of the wind during one-half of its revolution, and then of the wind, in tacking, on its other side for half of the remaining distance. The remaining quarter of the circle is passed by the aid of the other sails and the momentum of the mechanism as a whole.

As a protection against injury by sudden gusts I employ the following devices:

P designates a vertical rock-shaft provided at its lower end with two arms, p p', that diverge at an angle of ninety degrees, in proximity to one of the sails. Q is a similar shaft, which has an arm, q, extending alongside of another sail. These shafts P Q are journaled in the brackets and brace-bars which make up the general frame of the machine, or in the brackets alone. They are connected together by an arm, P', which is fixed on shaft P, and a link-bolt, Q', which slides through shaft Q, against the resistance of a spring, $Q^2$. These parts P' and Q' are jointed together. Under ordinary circumstances they occupy the position shown in Figs. 1 and 2—that is, inclined inward, with the joint in close proximity to the hollow main shaft B. Spring Q' tends to hold them in that position, and to prevent the sail inclosed between arms $p\ p'$ from moving or turning forward, but does not prevent it from turning backward for the tack, as before described. If, however, a violent gust strikes said sail, its frame will be driven against arm $p$ with such force as to overcome the resistance of spring $Q^2$, and to throw the joint outward, as shown in Fig. 4. When in this position the said sail is inclosed between the arms $p\ p'$, and cannot move in either direction. The following sail is left free, by the simultaneous turning of arm $q$, to come in line with the wind. This is facilitated by the peculiar construction of the cushioning-springs of said sail, which, unlike those of the other sails, are pivoted like a lever of the first kind, and will allow the sail to come into line without bending them. The play of their rear ends is limited by flattened staples $n^2\ n^2$, or equivalent devices. To distinguish these pivoted springs from those of the other sails, they are designated $g^2$ on the drawings. When the sail first mentioned is locked, as above stated, the wind holds it in line with the wind, and the other sails are blown into line therewith also. The mill is then at a standstill.

To allow the unlocking of the sail locked by arms $p\ p'$, I fasten the middle part of a horizontal lever, R, on the upper end of the upright bar E, which supports said sail. From the ends of said lever cords S S pass to the upper end of the hollow main shaft B and down through the same to the ground. By pulling one of these cords S the frame of said sail is forced against pin $p'$ so as to turn it in spite of the resistance of spring Q' and force the joint inward to its original position. This movement necessarily turns shaft Q and pin or arm $q$ a distance of ninety degrees, said arm being behind the sail which it is designed to lock. The said sail swings freely on its upright bar E under the influence of the wind, keeping in line with the latter and turning to the rearward, until having nearly completed a revolution it again comes into contact with the arm $q$, which is then in front of it, and prevents further rotation, except by reverse motion. The springs $g'\ g^2$ of said sail allow the rotary movement of said sail above described, as their limiting-staples $n^2\ n^2$ are arranged on one side of the central longitudinal lines of said springs, so as to allow more play in one direction than in the other. Thus the said springs are forced out of the recesses in flanges $e$ when the sail turns, as above stated, and exert only sufficient pressure against the periphery thereof during the greater part of the revolution as will insure sufficient resilience in said springs to make them fly into the opposite sides of the recesses when the latter come round again. The sail, when stopped by the arm or pin $q$, is free to turn ninety degrees for the tack under the pressure of the wind on the opposite side. Further than this, however, the springs $g'\ g'$ will not allow it to go in that direction, as the tails of said springs strike against those sides or ends of the staples $n$, which are nearly in line with the pivots of said springs and the center of shaft B, and the heads of the springs are not sufficiently inclined to let the flanges $e$ ride past them. By pulling on cord S the lever R is turned so as to force the sail-frame operated thereby back against arm $p$ with sufficient force to throw shaft P into position for locking the sail on which it operates, and to turn shaft Q so as to free the following sail for turning into line with the wind, as before described. Thus the stopping of the sails may be effected by hand as well as automatically.

I have shown a windmill having three sails, but, of course, a larger number may be employed with a corresponding increase of their supporting, bracing, and operating devices. By a few slight changes the machine may be adapted to work by rotation in either direction. For most purposes, however, rotation in one direction only will suffice.

The hollow shaft B is very serviceable, not only on account of its increased strength in proportion to its weight, but because of the protection it affords to the cords that pass down through it. These cords are shown as of rope, but chains or wires may be substituted.

I do not confine myself to any particular size or material for any part of my machine, and equivalents may obviously be substitued without departing from the spirit and scope of my invention.

Having thus fully described my invention, what I claim as new, and desire to secure by Letters Patent, is—

1. In a windmill, the combination of a set of sails and sail-frames with stops supported by the main frame, which allow each sail to turn a certain distance backward after passing half round the circle, in order to obtain the action of the wind on said sail while tacking in the third quarter of the circle.

2. A pair of pivoted reefing-arms in combination with a sail attached thereto, a sail-frame supporting said arms, and a governor operating to force them together when the speed becomes excessive.

3. In combination with a sail, sail-frame, and pivoted reefing-arms, a reefing-cord which passes from the lower arm up through the frame and then down to the ground, a linked connection between said arms to make them work in unison, and a weight which tends to keep them apart.

4. In combination with a windmill-sail, a shaft, P, and attached locking devices arranged to be thrown by the force of the wind into position to hold the guiding-sail parallel thereto, and thus prevent the mill from turning.

5. A lever and cords turning a windmill-sail at will in either direction, in combination with a locking device for said sail which will yield when the sail is strongly pulled in either direction.

6. In combination with the sails, sail-frames, reefing-bars, and upright rocking bars E, the journal-blocks E', recessed or channeled to serve as guides for the reefing-cords, substantially as set forth.

7. In combination with the brackets and springs secured thereto, the upright rocking bars E, and the blocks E' carried thereby, and provided with flanges for engaging with said springs, as set forth.

8. The shaft P, having arms $p\ p'$, in combination with shaft Q and a jointed connection between them which may be bent either inward or outward, a spring, Q', operating to prevent it from changing position, and a windmill-sail and sail-frame between said arms $p\ p'$.

9. In combination with a windmill tower or base and shaft, a support for the frames, and a set of conical rollers interposed between said support and said tower or base and bearing directly against the top of said tower or base, for the purposes set forth.

10. In combination with a windmill-sail and reefing-arms, a horizontal bar or rod fixed to the sail-frame, a collar moving on said rod, a pair of link-bars connecting said collar with said reefing-arms, a pitman operated by said collar, a crank-shaft rocked by said pitman, and a pendulum-ball having its shaft or shank hinged or swiveled thereto.

11. In combination with a windmill-sail arranged to be locked on both sides, substantially as set forth, a following sail, a shaft, Q, having arm $q$ for a stop on one side of said following sail, and a pair of springs which will allow said sail to turn almost entirely around in one direction, but in the other direction only ninety degrees.

12. In combination with shaft Q, arm $q$, and devices for partly rotating and rocking the same, a sail and sail-frame carrying recessed flanges $e$, and the pivoted springs $g'\ g'$, which are allowed farther play in one direction than the other, in order that they may permit the sail to turn entirely round backward, but only ninety degrees forward, substantially as described.

In testimony whereof I affix my signature in presence of two witnesses.

FERREE L. McILVAINE.

Witnesses:
SAMUEL P. BAIF,
JACOB UMBLE.